United States Patent
Suzuki et al.

(10) Patent No.: US 9,272,560 B2
(45) Date of Patent: Mar. 1, 2016

(54) THERMAL TRANSFER SHEET

(71) Applicant: DAI NIPPON PRINTING CO., LTD, Tokyo (JP)

(72) Inventors: Tomoko Suzuki, Tokyo (JP); Yoshimasa Kobayashi, Tokyo (JP); Kano Sakamoto, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 73 days.

(21) Appl. No.: 14/346,895

(22) PCT Filed: Sep. 26, 2012

(86) PCT No.: PCT/JP2012/074648
§ 371 (c)(1),
(2) Date: Mar. 24, 2014

(87) PCT Pub. No.: WO2013/047560
PCT Pub. Date: Apr. 4, 2013

(65) Prior Publication Data
US 2014/0212604 A1 Jul. 31, 2014

(30) Foreign Application Priority Data

Sep. 30, 2011 (JP) ................................. 2011-218137
Sep. 12, 2012 (JP) ................................. 2012-201010

(51) Int. Cl.
*B41M 5/42* (2006.01)
*B41M 5/44* (2006.01)
*B32B 5/16* (2006.01)

(52) U.S. Cl.
CPC .. *B41M 5/44* (2013.01); *B32B 5/16* (2013.01); *B41M 5/42* (2013.01); *B41M 2205/02* (2013.01); *B41M 2205/04* (2013.01); *B41M 2205/34* (2013.01); *B41M 2205/36* (2013.01)

(58) Field of Classification Search
CPC ...... B41M 5/42; B41M 5/44; B41M 2205/02; B41M 2205/04; B41M 2205/34; B41M 2205/36; B32B 5/16; Y10T 428/259
USPC ..................... 503/227; 428/32.64, 32.66, 331
See application file for complete search history.

(56) References Cited

FOREIGN PATENT DOCUMENTS

| JP | 07-329439 | 12/1995 |
|----|-----------|---------|
| JP | 10-138649 | 5/1998 |
| JP | 2005-119154 | 5/2005 |
| JP | 2007-307764 | 11/2007 |

OTHER PUBLICATIONS

International Search Report, PCT/JP2012/074648, Oct. 23, 2012.

*Primary Examiner* — Bruce H Hess
(74) *Attorney, Agent, or Firm* — Young & Thompson

(57) ABSTRACT

Provided is a thermal transfer sheet capable of repressing residue that accumulates before insertion of a heating element of the thermal head. In the thermal transfer sheet, a heat-resistant lubricating layer is formed on a surface of the substrate, wherein the heat-resistant lubricating layer includes one or more of layers which include a back face layer, the back face layer is arranged at a position farthest from the substrate, at least one layer which composes the heat-resistant lubricating layer includes a binder resin and organic minute particles which each has a polygonal shape, and a portion of surfaces of the organic minute particles protrude from a surface of the back layer.

22 Claims, 2 Drawing Sheets

THERMAL TRANSFER SHEET

TECHNICAL FIELD

This invention relates to a thermal transfer sheet, and more particularly, the present invention relates to a thermal transfer sheet which is capable of repressing generation of residue that will accumulate around a heating element of a thermal head, and which can avoid wear of the thermal head.

BACKGROUND ART

Currently, sublimation type thermal transfer recording method is known, in which a thermal transfer sheet comprising a colorant layer provided on one side of a substrate such as polyester film, the color layer comprising sublimation type dyes supported by a suitable binder is superposed on an image-receiving article, then another side of the substrate is allowed to be in contact with a thermal head so as to perform heat treatment by the thermal head, and thereby the sublimation type dyes are transferred to the image-receiving article. According to the sublimation type thermal transfer recording method, since it is possible to control the transferring amount of the sublimation type dye dot unit by dot unit with varying the amount of energy applied to the thermal transfer sheet, it is possible to perform a density gradation. Therefore, this method can provide a high quality image which is very vivid, and excels in the transparency, and the color reproducibility and the gradient of halftones, and which is comparable to full-color photograph image.

Incidentally, with respect to the thermal transfer sheet, when the printing is performed by contacting directly the thermal head directly to the substrate, a probable case that a sticking is caused by a frictional force generated between the substrate and the thermal head will arise, and this will result in printing failure. Further, there is a possibility that the substrate is fused to the thermal head by the heat during printing, and this fusion will prevent the travel of the thermal transfer sheet. As results, not only the sticking, but also the fracture of the sheet may arise in extreme cases. Accordingly, in the field of thermal transfer sheet, a backing layer which is provided on the other surface of the substrate for the purpose of improving the thermal resistance and giving the driving stability by imparting lubricity is usually adopted.

However, with respect to the backing layer for the purpose of driving stability, a problem that the residue derived from the components of the backing layer is accumulated around the heating element of the thermal head during the thermal transfer is inherent. If the residue is attached to the thermal head, there is a probably case that the heat from the thermal head will be not transmitted sufficiently to the thermal transfer sheet, and thus the formation of high-quality image can not be attained, and there is also a case that printing flaws due to the residue that has accumulated occurs. Further, in a printing condition where a concentrated solid printing portion and a gradation pattern portion of halftone are adjacent to each other among many printing conditions, when the heating energy applied to the thermal head is rapidly changed from the high level to the low level, a problem which seems to be the influence of residue that has been accumulated at the contact portion between the thermal head and the back face side of the thermal transfer sheet, and in which a dirt tailing (inconsistencies in density) arises in the gradation pattern portion of the halftone, will arise. Therefore, in the field of thermal transfer sheet, to prevent the residue of the backing layer attaching to the thermal head, or to prevent the attached residue accumulating to the thermal head, has become an important subject.

Under such a circumstance, for instance, in Patent Literature 1, a thermal transfer sheet which is provided with a back face layer containing an organic filler is disclosed. According to the thermal transfer sheet disclosed in the Patent Literature 1, there is no adhesion of residue to the thermal head, and it does not cause faulty transfer of the transcriptive protective layer. Further, in addition to this literature, various thermal transfer sheets each back face layer of which contains minute particles for removing the residue attached to the thermal head have also been proposed.

PRIOR ART DOCUMENT

Patent Literature

Patent Literature 1: JP 2007-307764 A

SUMMARY OF INVENTION

Problem to be Solved by the Invention

However, it is difficult, for the thermal transfer sheet which comprises a back face layer as disclosed in the Patent Literature 1, and the thermal transfer sheets which have been proposed to date, to satisfy both of a repressive effect to the attaching of the residue to the thermal head and a preventing effect to the wearing of the thermal head. Further, with respect to the shape of the organic filler contained in the back face layer of the Patent Literature 1, it can not be said that the performance for scraping the residue attached to the thermal head is sufficient. Therefore, not only the kind of component contained in the back face layer, but also its shape should also be considered.

The present invention is the one contrived in such a situation, and a main purpose of the present invention is to provide a thermal transfer sheet which can satisfy both of a repressive effect to the attaching of the residue to the thermal head and a preventing effect to the wearing of the thermal head, and which is capable of maintaining these effects for a long time.

Means for Solving the Problem

The present invention for solving the above mentioned problem is a thermal transfer sheet in which a heat-resistant lubricating layer is formed on a surface of the substrate, wherein the heat-resistant lubricating layer comprises one or more of layers which include a back face layer; wherein the back face layer is arranged at a position farthest from the substrate in the case that the heat-resistant lubricating layer comprises two or more of the layers; wherein at least one layer which composes the heat-resistant lubricating layer comprises a binder resin and organic minute particles which each has a polygonal shape; and wherein a portion of surfaces of the organic minute particles protrude from a surface of the back layer.

Further, the organic minute particles may be silicone resin minute particles. An average particle diameter of the organic minute particles in the case of the organic minute particles are contained in the back face layer may be not less than 0.3 μm and not more than 15 μm.

Further, the binder resin contained in the back face layer may be a cured resin in which one or both of polyvinyl butyral resin and polyvinyl acetal resin was cured by an isocyanate curing agent, and a molar equivalent ratio of hydroxyl groups included in one or both of polyvinyl butyral resin and polyvinyl acetal resin and isocyanate groups of the isocyanate curing agent, (—NCO/—OH), may be not less than 0.01 and less than 0.7.

Effect of the Invention

According to the thermal transfer sheet of the present invention, it is possible to provide a thermal transfer sheet which can satisfy both of the repressive effect to the attaching of the residue to the thermal head and the preventing effect to the wearing of the thermal head, and which is capable of maintaining these effects for a long time. Further, according to one embodiment of the thermal transfer sheet of the present invention, it is possible to realize full performance desired for the back face layer by adjusting cross-linking density of the back face layer.

EMBODIMENTS FOR CARRYING OUT THE INVENTION

Hereinafter, the thermal transfer sheet 10 according to the present invention will be described concretely with reference to drawings. As shown in FIGS. 1-6, the thermal transfer sheet 10 of the present invention is a thermal transfer sheet in which a heat-resistant lubricating layer 7 is formed on a surface of the substrate 1, wherein the heat-resistant lubricating layer 7 comprises one or more of layers which include a back face layer 5; wherein the back face layer 5 is arranged at a position farthest from the substrate in the case that the heat-resistant lubricating layer 7 comprises two or more of the layers; wherein at least one layer which composes the heat-resistant lubricating layer 7 comprises a binder resin and organic minute particles which each has a polygonal shape; and wherein a portion of surfaces of the organic minute particles protrude from a surface of the back face layer.

Figure 1:
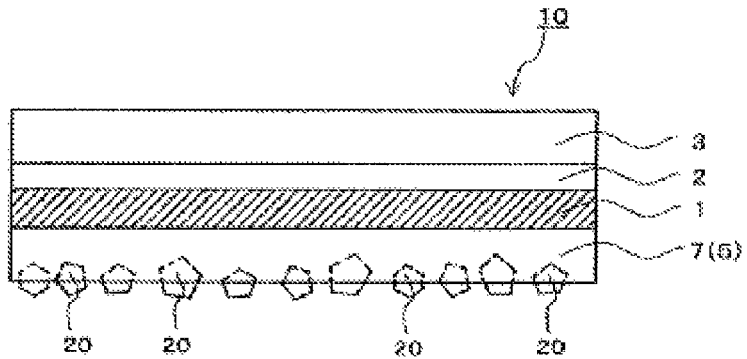
FIG. 1 is a schematic sectional view showing an example of the thermal transfer sheet of the present invention which comprises a heat-resistant lubricating layer of a first embodiment.
Figure 2:
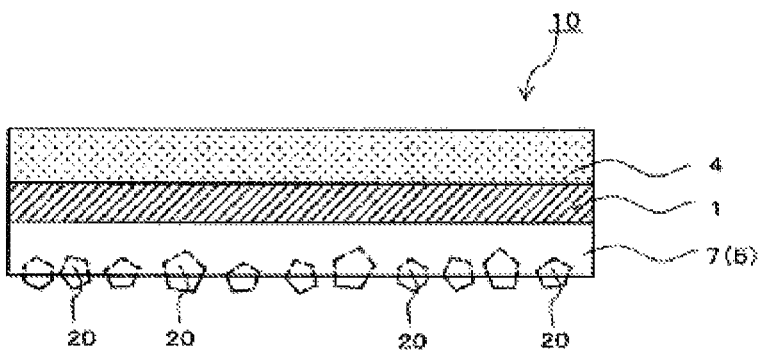
FIG. 2 is a schematic sectional view showing an example of the thermal transfer sheet of the present invention which comprises a heat-resistant lubricating layer of the first embodiment.

FIGS. 1-4 are schematic sectional views each showing an example of the thermal transfer sheet 10 of the present invention in which the polygonal shaped organic minute particles 20 are included in the back face layer 5 which constitutes the heat-resistant lubricating layer 7 and a portion of surfaces of the organic minute particles protrude from a surface of the back face layer 5, in other words, are schematic sectional views each showing an example of the thermal transfer sheet 10 of the present invention which has a heat-resistant lubricating layer 7 of a first embodiment. In FIGS. 1 and 2, examples in which the heat-resistant lubricating layer 7 is constituted only by the back face layer 5 are illustrated, and in FIGS. 3 and 4, examples in which the heat-resistant lubricating layer 7 is constituted by two or more layers including the back face layer 5.

Figure 5:
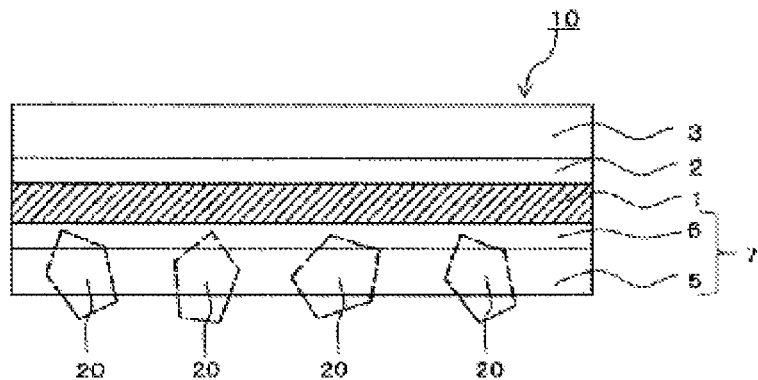
FIG. 5 is a schematic sectional view showing an example of the thermal transfer sheet of the present invention which comprises a heat-resistant lubricating layer of a second embodiment.
Figure 6:
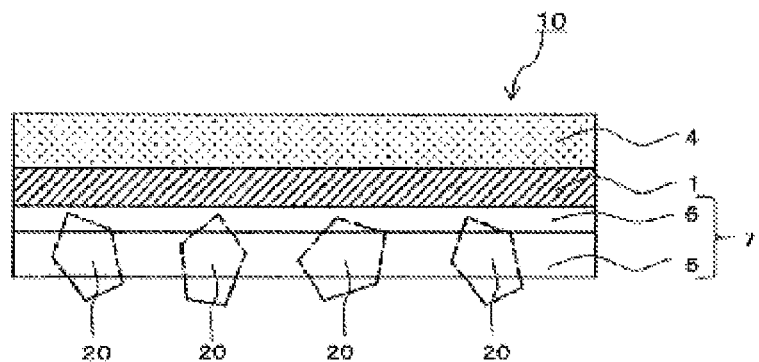
FIG. 6 is a schematic sectional view showing an example of the thermal transfer sheet of the present invention which comprises a heat-resistant lubricating layer of the second embodiment.

FIGS. 5 and 6 are schematic sectional views each showing an example of the thermal transfer sheet 10 of the present invention in which the heat-resistant lubricating layer 7 is constituted by two or more layers including the back face layer 5, the polygonal shaped organic minute particles 20 are contained in the layer(s) other than the back face layer 5 in the aforementioned two or more layers, and a portion of surfaces of the organic minute particles 20 which contained in the layer (s) other than the back face layer 5 protrude from a surface of the back face layer 5, in other words, are schematic sectional views each showing an example of the thermal transfer sheet 10 of the present invention which has a heat-resistant lubricating layer of a second embodiment.

Figure 3:
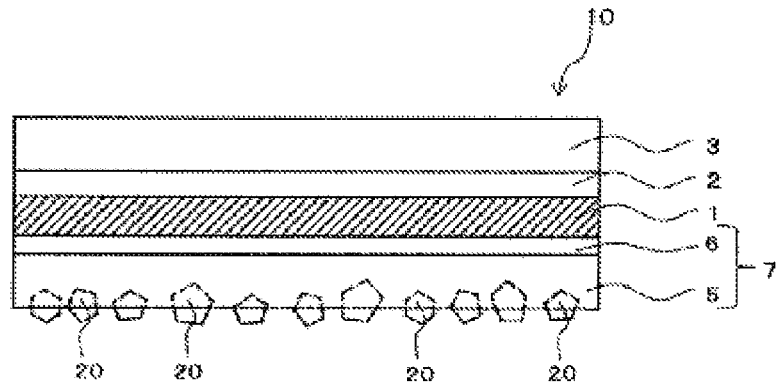
FIG. 3 is a schematic sectional view showing an example of the thermal transfer sheet of the present invention which comprises a heat-resistant lubricating layer of the first embodiment.
Figure 4:
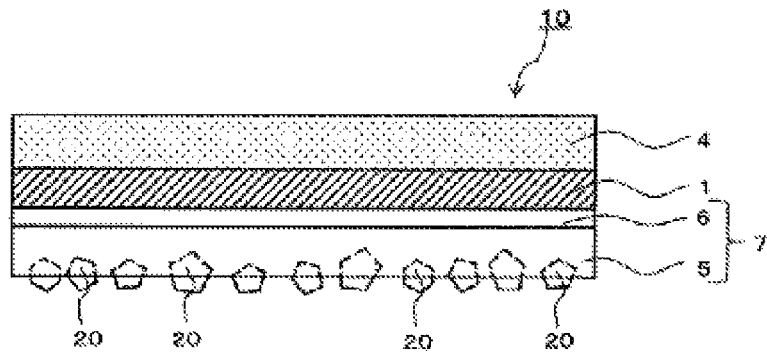
FIG. 4 is a schematic sectional view showing an example of the thermal transfer sheet of the present invention which comprises a heat-resistant lubricating layer of the first embodiment.

In the thermal transfer sheets of the embodiments shown in FIGS. 1, 3, and 5, a transcriptive protective layer 3 is provided on the other surface of the substrate 1, and in the thermal transfer sheet of the embodiments shown in FIGS. 2, 4, and 6, a color material layer 4 is provided on the other side of the substrate 1. Herein, the transfer protective layer 3, the color material layer 4, a primer layer 6, and a releasing layer 2 shown in FIGS. 1-6 are optional components of the thermal transfer sheet 10 of the present invention.

Hereinafter, the thermal transfer sheet 10 of the present invention will be described in further detail with reference to the drawings.

(Substrate)

The substrate 1 is an essential component of the thermal transfer sheet 10 of the present invention, and it is provided for the purpose of supporting the color material layer 4 or the transcriptive protective layer 3 and the heat-resistant lubricating layer 7 which includes the back face layer 5. Although the material for the substrate 1 is not particularly limited, but it is preferable that the material can withstand the heat applied by the thermal head in transferring the dyestuffs of the color material layer 4 or the transcriptive protective layer 3 onto a transcription receiving article, and has a mechanical strength which brings no harm in handling. As such a substrate 1, for instance, various plastic films or sheets, including polyesters such as polyethylene terephthalate, polyarylates, polycarbonates, polyurethanes, polyimides, polyetherimides, cellulose derivatives, polyethylenes, ethylene-vinyl acetate copolymers, polypropylenes, polystyrenes, acrylic resins, polyvinyl chlorides, polyvinylidene chlorides, polyvinyl alcohols, polyvinyl butyrals, nylons, polyether ether ketones, polysulfones, polyether sulfones, tetrafluoroethylene-perfluoroalkyl vinyl ethers, polyvinyl fluorides, tetrafluoroethylene-ethylene, tetrafluoroethylene-hexafluoropropylene, polychlorotrifluoroethylenes, polyvinylidene fluorides, and the like, can be enumerated. Further, the thickness of the substrate 1 can be appropriately set depending on the material to be used so that the strength and the heat resistance thereof become appropriate values, and may be in the range of about 2.5 to 100 μm in general, and preferably, in the range of about 1 to 10 μm.

(Heat-Resistant Lubricating Layer)

As shown in FIGS. 1 to 6, the heat-resistant lubricating layer 7 which comprises one or more layers is provided on one surface of the substrate 1 (the lower surface of the substrate 1 in the case shown in FIG. 1). In the thermal transfer sheet according to the present invention, the back face layer 5 is invariably included in the heat-resistant lubricating layer 7, in either of the case that the heat-resistant lubricating layer is composed of one layer, and the case that it is composed of two or more layers. Therefore, when the heat-resistant lubricating layer 7 is composed of one layer, the back face layer 5, per se, becomes the heat-resistant lubricating layer 7, and as a result, the organic minute particles 20 each having the polygonal shape are contained in the back face layer 5. On the other hand, in the case that the heat-resistant lubricating layer 7 comprises two or more of the layers, the back face layer 5 is arranged at a position farthest from the substrate 1 in heat-resistant lubricating layer. Hereinafter, with respect to the heat-resistant lubricating layer 7, the case where the polygonal shaped organic minute particles 20 are contained in the back face layer 5 and a portion of the surfaces of the polygonal shaped organic minute particles 20 protrudes from the surface of the back face layer 5, and the case where the polygonal shaped organic minute particles 20 are contained in the layer (s) other than the back face layer 5 and a portion of the surfaces of the polygonal shaped organic minute particles 20 protrudes from the surface of the back face layer 5, will be described separately.

(Heat-Resistant Lubricating Layer of the First Embodiment)

As shown in FIGS. 1-4, the heat-resistant lubricating layer 7 of the first embodiment is composed of one, or two or more layers, including a back face layer 5 as an essential component.

(Back Face Layer in the First Embodiment)

In the heat-resistant lubricating layer 7 of the first embodiment, the back face layer 5 contains a binder resin and the polygonal shaped organic minute particles 20, and a portion of the surfaces of the polygonal shaped organic minute particles 20 which contained in the back face layer 5 protrudes from the surface of the back face layer 5. Now, the polygonal shaped organic minute particles 20, and the binder resin will be explained.

"Polygonal Shaped Organic Minute Particles"

As shown in FIGS. 1-4, in the back face layer 5 which constitutes the heat-resistant lubricating layer, the organic minute particles 20 each having polygonal shape are contained. With respect to the polygonal shaped organic minute particles 20 located near the surface of the back face layer 5, a portion of the surface of the organic minute particles protrudes from the surface of the back face layer 5. In the present invention, by the polygonal shaped organic minute particles that protrude from the surface of the back face layer 5, a scraping performance against the residue attached to the thermal head is imparted to the heat-resistant lubricating layer 7 which includes the back face layer 5.

In the present invention, the back face layer 5 which constitutes the heat-resistant lubricating layer contains the organic minute particles for imparting the performance scraping the residue adhered to the thermal head, and it is an essential requirement that the organic minute particles possess polygonal shape. Accordingly, the organic minute particles each having no corner or jag, for example, organic minute particles each having spherical shape, are excluded from the interested polygonal shaped organic minute. Herein, the above mention is not intended to prohibit the spherical shaped organic minute particles from containing in the back face layer 5 which constitutes the heat-resistant lubricating layer. As long as the polygonal shaped organic minute particles 20 are contained, any organic minute particles other than this polygonal shape may be arbitrarily contained therein. Hereinafter, unless otherwise noted, in the case of being described as "organic minute particles" simply, it means the polygonal shaped organic minute particles.

Next, the mechanism for scraping the residue which is derived from the component of the back face layer and is adhered to the thermal head, by the polygonal shaped organic minute particles 20 on running of the thermal head will be explained. As can be seen in figures, through the surface of the back face layer 5 which constitutes the heat-resistant lubricating layer, a portion of the surface of the polygonal shaped organic minute particles 20 protrudes. Thus, certain asperities are given to the surface of the back face layer 5 constituting the heat-resistant lubricating layer, by the organic minute particles 20 which thus protrude. Since the organic minute particles 20 are harder than the resin contained in the back face layer 5 which constitutes the heat-resistant lubricating layer, the residue adhered to the thermal head will be removed as being scraped by convex portions that are formed on the surface of the back face layer 5 on running of the thermal head. Furthermore, in the present invention, since the organic minute particles which contribute to the formation of the asperities are polygonal shapes, corners are also present on the protruding portions, i.e. the convex portions, and a very high scraping effect to the residue will be exhibited by these corners.

Further, since the interested component contained in the back face layer 5 which constitutes the heat-resistant lubricating layer is the organic minute particles 20 as described above, there is no fear that the component wears down the thermal upon scraping the residue adhered to the thermal head, in contrast to the case of using inorganic minute particles. In other words, it is possible to prevent wear of the thermal head by adopting the organic minute particles which protrude in a part from the surface of the back face layer 5 which constitutes the heat-resistant lubricating layer. As a result, it becomes possible to prevent the occurrence of printing inferiority, such as printing wrinkle and printing faint, which may be caused by the wearing of the thermal head, and further to prevent the printer from becoming shortened its useful life, which is also accompanied by the wearing of the thermal head.

There is no particular limitation for the particle diameter of the polygonal shaped organic minute particles 20 which are contained in the back face layer 5 which constitutes the heat-resistant lubricating layer. However, in the case that the particle diameter of the organic minute particles 20 is markedly small, for example, it is less than 0.3 µm, there is a possible case that it becomes difficult to protrude a portion of the organic minute particles through the surface of the back face layer 5, even if the organic minute particles has been adequately dispersed in the liquid for forming the back face layer 5 which constitutes the heat-resistant lubricating layer. On the other hand, in the case that the particle diameter of the organic minute particle are increased considerably, for example, it is greater than 15 µm, there is a possible case that the organic minute particles 20 are dropped out of the back face layer 5 on the running of the thermal head.

Considering these points, it is preferable that the particle diameters of the polygonal shaped organic minute particle 20 to be contained in the back face layer which constitutes the heat-resistant lubricating layer is in the range of not less than 0.3 µm and not more than 15 µm, and more particularly, in the range of not less than 4 µm and not more than 11 µm. In particular, by setting the particle diameter within the range of not less than 4 µm and not more than 11 µm, it is possible to improve the performance of scraping minute sludge adhered to the thermal head. Furthermore, when the thickness of the back face layer 5 which constituted the heat-resistant lubricating layer is appropriately adjusted while the particle diameter is set within the above mentioned range, it becomes possible to put the volume of the part of the organic minute particles which protrudes through the surface of the back face layer to be smaller than the volume of the remaining part of the organic minute particles which is embedded in the back face layer, and thus to set the protruding amount to be less shedding frequency on the running of the thermal head.

Herein, the particle diameter of the organic minute particles 20 is an average particle diameter measured by a particle size distribution measuring apparatus in accordance with the laser diffraction scattering method, and is a volume average particle diameter calculated by volume basis. As the particle size distribution measuring apparatus, for instance, it is possible to utilize a Coulter LS230, manufactured by Beckman-Coulter, Inc., etc. This is similarly applicable to the organic minute particles 20 contained in the heat-resistant lubricating layer of the second embodiment which will be described below.

By incorporating the above mentioned polygonal shaped organic minute particles 20 into the back face layer 5 which constitutes the heat-resistant lubricating layer 7, the thermal transfer sheet of the present invention can satisfy both of the suppression performance to the residue adhering to the thermal head, and an anti-wearing performance to the thermal head. As the polygonal shaped organic minute particles 20, for instance, silicone resin particles, fluorine-containing resin filler, particles made of an organic resin, such as acrylic resin, lauroyl resin, phenol resin, acetal resin, polystyrene resin, nylon resin, etc., and particles made of a cross-linked resin in which any of above mentioned resin was reacted with a cross-linking agent, may be enumerated, but it is not limited thereto, and may be appropriately selected and used from organic particles known in the art, as long as the organic particles to be used meet the requirement of being the polygonal shape.

Further, it is preferable that the polygonal shaped organic particles possess a high heat resistance. By incorporating the polygonal shaped organic minute particles having high heat resistance into the back face layer 5, it is possible to prevent that a thermal head and the surface of the back face layer 5 causes a thermal fusion on printing, and further it becomes possible to prevent the occurrence of printing flaws due to interference with traveling of the thermal transfer sheet by such a thermal fusion. As the organic minute particles having high heat resistance, for instance, the silicone resin minute particles, etc., can be enumerated.

As the organic minute particles, it is also possible to use any commercially available product, as-is, and as the silicone resin minute particles, for example, Tospearl 120, manufactured by Momentive Performance Materials Japan LLC and MSP-4000, manufactured by Nikko Rika Corp., etc., can be enumerated. The silicone resin minute particles mentioned above (Tospearl 240 has a thermal decomposition temperature of 420° C., and the silicone resin minute particles (MSP-4000 has a thermal decomposition starting temperature of not less than 350°, and thus they are excellent in the heat resistance, they can be suitably used in the present invention.

Although there is no particular limitation for the addition amount of the polygonal shaped organic minute particles 20 to be contained in the back face layer 5, but when the addition amount of the organic minute particles 20 is less than 0.01% by weight on the basis of the solid content of the back face layer 5, there is a possibility that the degree of protrusions by the organic minute particles 20 on the surface of the back face layer 5 is reduced, which will be followed by insufficient performance of scrapping the residue. On the other hand, when the addition amount of the organic minute particles 20 is more than 3% by weight, there is a possibility that friction between the thermal head and the back face layer 5 is increased, which will be followed by occurrence of printing wrinkle, or printing defect. Considering these points, it is preferable that the adding amount of the organic minute particles 20 is to be in the range of not less than 0.01% by weight and not more than 3% by weight on the basis of the basis of the solid content of the back face layer 5.

(Binder Resin)

As the resin to be included in the back face layer 5, there is no particular limitation, and, for instance, polyvinyl acetal resins, polyvinyl butyral resins, acrylic resins, polyester resins, styrene-maleic acid copolymers, polyimide resins, polyamide resins, polyamide-imide resins, cellulose acetate propionate, cellulose acetate butyrate, cellulose acetate, polyvinylidene fluoride, nylons, polyvinyl carbazole, chlorinated rubbers, cyclized rubber and polyvinyl alcohol, may be enumerated. In consideration of the heat resistance, those of which have a glass transition point of not less than 60° C. resins are preferably used.

In addition, it is said that the binder resin contained in the back face layer 5 gives a significant impact on the cross-linking density of the back face layer 5. And, in general, as the cross-linking density of the back face layer 5 becomes high, the heat resistance of the back face layer 5 is improved more. On the other hand, in the case that it is allowed to contain a lubricant component to the backing layer 5, if the cross-linking density of the back face layer 5 is set too high, it becomes impossible to bleed sufficiently the lubricant component to the surface of the back face layer 5 on the running of the thermal head, and thus, it will become a factor of blocking the action of the lubricant component.

Accordingly, with respect to the binder resin to be contained in the back face layer 5, it is preferable that its cross-linking density is adjusted to a degree at which the action of the lubricant component is never blocked while imparting a certain heat resistance to the back face layer 5. Considering these points, it is preferable that the binder resin contained in the back face layer 5 is a cured resin in which one or both of a polyvinyl butyral resin which has many hydroxyl groups (—OH) in its molecule and a polyvinyl acetal resin such as polyvinyl acetoacetal resin was cured by an isocyanate curing agent, and a molar equivalent ratio of hydroxyl groups included in one or both of the polyvinyl butyral resin and the polyvinyl acetal resin and isocyanate groups of the isocyanate curing agent, (—NCO/—OH), is not less than 0.01 and less than 0.7.

In the case that this cured resin is applied, since the binder resin is cured within a defined range, it becomes possible to impart a heat resistance to the back face layer 5, the level of which is no problem in use, and possible to bleed the lubricant component, which is optionally contained in the back face layer, to the surface of the back face layer 5 on the printing, so that the lubricant component can be sufficiently exerted its function.

It is preferable that the polyvinyl acetal resin for forming the cured resin has a hydroxyl value of being not less than 9% by weight and not more than 25% by weight. When satisfying this range, it is possible to improve the heat resistance, and to dissolve readily in a solvent, such as toluene and ethyl acetate. As the polyvinyl acetal resin having such a degree of the hydroxyl value, for instance, S-LEC BX-L, BX-1, BX-5, KS-1, KS-3, KS-5, KS-10, manufactured by Sekisui Chemical Co., Ltd., and the like can be enumerated. Herein, in this specification, the term "hydroxyl value" is intended to mean the proportion of monomer component having hydroxyl group in a resin polymer, and it is calculated as the ratio of the weight of the monomer component having the hydroxyl group to the total weight of the resin polymer (% by weight).

Isocyanate curing agent is one that functions to improve the film strength or heat resistance of the heat resistant lubricating layer, by cross-linking the polyvinyl butyral resin, or the polyvinyl acetal resin as above mentioned with using the hydroxyl groups of its own. Although a variety of isocyanate curing agents are conventionally known in the art, it is desirable to use adducts of aromatic isocyanates. As the aromatic isocyanates, for instance, 2,4-toluene diisocyanate, 2,6-toluene diisocyanate, or a mixture of 2,4-toluene diisocyanate and 2,6-toluene diisocyanate, 1,5-naphthalene diisocyanate, tolidine diisocyanate, p-phenylene diisocyanate, trans-cyclohexane, 1,4-diisocyanate, xylylene diisocyanate, triphenyl methane diisocyanate, tris(isocyanate phenyl) thiophosphate and the like are enumerated, and, in particular, 2,4-toluene diisocyanate, 2,6-toluene diisocyanate, or, the mixture of 2,4-toluene diisocyanate and 2,6-toluene diisocyanate is preferred.

"Polyethylene Wax"

The back face layer 5 may contain a polyethylene wax or a talc. The polyethylene wax is one that functions to improve the slipping property of the back face layer 5, whereas the above mentioned polygonal shaped organic minute particles 20 are contained to satisfy both of the suppression performance to the residue adhering to the thermal head and the anti-wearing performance to the thermal head. As the polyethylene wax, polyethylene wax particles having a density of 0.94 to 0.97, for instance, the particles obtained by finely powdering the polyethylene wax, are preferred. As the polyethylene wax, high-density or low-density polyethylene waxes are available. The low-density polyethylene contains ethylene polymers that are structurally branched in a large proportion. On the other hand, the high-density polyethylene is mainly constituted by linear structures of polyethylene.

As the polyethylene wax, those having a mean particle diameter of being not less than 1 µm and not more than 15 µm are suitable to be used. When the polyethylene wax having the mean particle diameter within the above defined range is contained, it is possible that a portion of the high-density polyethylene wax is protruded through the surface of the back face layer 5 to improve the slipping property of the thermal transfer sheet. Further, in combination with the scraping effect to the residue adhering to the thermal head which is owing to the polygonal shaped organic minute particle as described above, it is possible to further improve the performance of scraping the residue adhering to the thermal head.

Preferably, the polyethylene wax is contained at a ratio of 1% to 15% by weight on the basis of the total solid content of the back face layer. When the content is set within the above defined range, it is possible to impart a particularly excellent slipping property to the back face layer 5. Preferably, the polyethylene wax has a melting point of 110 to 140° C.

"Talc"

From the same viewpoint as the polyethylene wax, it is preferable that the talc is contained in the back face layer 5, instead of the polyethylene wax, or in company with the polyethylene wax.

As the talc, the one which has a particle diameter of not less than 1 µm and not more than 15 µm is preferably used. Effects due to inclusion of the talc of this range are the same as those of the polyethylene wax described above.

It is preferable that the talc is contained in a ratio of 1% by weight and not more than 10% by weight on the basis of the total solid content of the back face layer. By using the above range in content, it is possible to impart a particularly excellent lubricity to the back face layer 5. Note that, when the talc is used in conjunction with the polyethylene wax, it is preferable that the total weight of the talc and the polyethylene wax is within the above range.

Further, it is also possible to add a metallic soap, phosphoric acid ester, etc., as a lubricant, to the back face layer 5. As the metallic soap, for example, multivalent metallic salts of alkyl phosphoric esters, metallic salts of alkyl carboxylic acid, etc., may be enumerated. As the above mentioned multivalent metallic salts of alkyl phosphoric esters, the ones which are known in the art as additive for plastics may be used. The above mentioned multivalent metallic salt of alkyl phosphoric ester can be obtained, in general, by substituting an alkali metallic salt of the alkyl phosphoric ester with a polyvalent metal, and the ones of various grades may be available.

As the phosphoric acid ester, for example, (1 phosphoric monoesters or diesters of saturated or unsaturated higher alcohols having a carbon number of 6 to 20, (2 phosphoric monoesters or diesters of polyoxyalkylene alkyl ethers or polyoxyalkylene alkyl allyl ethers, (3 phosphoric diesters or monoesters of alkylene oxide adducts (average addition molar number: 1-8 of the above mentioned saturated or unsaturated alcohols, (4 phosphoric monoesters or diesters of alkyl phenols or alkyl naphthols which have an alkyl group having a carbon number of 8-12, are enumerated. As the saturated and unsaturated higher alcohols for the above (1 and (3 compounds, for example, cetyl alcohol, stearyl alcohol, oleyl alcohol, etc., are enumerated. As the alkyl phenol for the above (3 compounds, for example, nonyl phenol, dodecyl phenol, diphenyl phenol, etc., are enumerated.

"Other ingredients"

Further, in the back face layer 5, in order to adjust the slipping of back face layer ancillary, it is possible to add inorganic minute particles or a silicone oil. As the inorganic minute particles, for example, clay minerals such as kaolin, carbonates such as calcium carbonate, magnesium carbonate, and hydroxides such as aluminum hydroxide, magnesium hydroxide, sulfate salts such as calcium sulfate, oxides such as silica, inorganic minute particles such as graphite, niter, boron nitride, and the like are enumerated.

As the inorganic minute particles described above, those of having an average particle diameter of about 0.3 µm-3 µm is preferably used. Further, it is preferable that the inorganic minute particles described above is used in a ratio of not less than 5 part by weight and not more than 40 part by weight, when the total weight of both of or ether of the polyvinyl acetal resin and the polyvinyl butyral resin used is taken as 100 parts by weight. By adopting this range, it is possible to improve the lubricity and to improve the film flexibility and the film strength of the back face layer.

There is no particular limitation for the thickness of the back face layer 5 which constitutes the heat-resistant lubricating layer 7, as long as the thickness can be made to protrude a portion of the surface of the polygonal shaped organic minute particles 20 through the surface of the back face layer 5. Herein, a possibility that organic minute particles 20 fall out of the back face layer 5 is increased, if the thickness of the back face layer 5 is too thin in comparison with the particle diameter of the polygonal shaped organic minute particles 20. On the other hand, a possibility that no portion of the surface of the organic minute particles protrude through the surface of the back face layer 5 is increased, if the thickness of the back face layer 5 is too thick in comparison with the particle diameter of the polygonal shaped organic minute particles 20.

There is no particular limitation about the method for forming the back face layer 5 which constitutes the heat resistant lubricating layer 7 of the first embodiment. The back face layer 5 may be formed by dissolving or dispersing the above mentioned the binder resin, and the polygonal shaped organic minute particles as the essential ingredients, and optionally, other various ingredients to be added, into a suitable solvent in order to prepare a coating liquid for forming the back face layer; coating thus prepared coating liquid onto the substrate 1 or onto any other layer which constitutes the heat resistant lubricating layer 7, in accordance with a known coating procedure such as the gravure printing method, the reverse roll coating method using a gravure plate, the roll coater, the bar coater or the like; and then drying the coated liquid.

Incidentally, the heat-resistant lubricating layer 7 of the first embodiment, may be composed only of the back face layer 5 which contains the polygonal shaped organic particles, as shown in FIGS. 1 and 2. Alternatively, it may be composed of two or more layers which include the back face layer 5 which contains the polygonal shaped organic particles and other layer (s), as shown in FIGS. 3 and 4. Even in either configuration, by the presence of the polygonal shaped organic minute particles, a portion of the surface of the particles protruding through the surface of the back face layer 5, it is possible to prevent wearing of the thermal head as described above. As the other optional layer(s), for instance, a primer layer 6 as shown in the figures, an antistatic layer, etc., can be enumerated. The other optional layer(s) may be one, or two or more.

(Primer Layer)

As shown in FIGS. 3, 4, it is possible to provide the primer layer 6 between the back face layer 5 and the substrate 1, a layer of any other constituting the heat-resistant lubricating layer 7, as the other optional layer(s) which constitutes the heat-resistant lubricating layer 7. The primer layer 6 constituting the heat-resistant lubricating layer 7 is a layer which is provided in order to improve the adhesion between the substrate 1 and the back face layer 5 constituting the heat-resistant lubricating layer 7. As the binder resin contained in the primer layer 6, for example, polyester resins, polyurethane resins, acrylic resins, polycarbonate resins, polyvinyl alcohol resins, vinyl chloride-vinyl acetate copolymer, polyvinyl butyral resins, etc., may be enumerated.

Further, the primer layer 6 may contain a curing agent, an adhesion promoter, an antistatic agent. As the adhesion promoter, aqueous polyurethanes, aqueous polyesters, water-based acrylic resins, etc., may be enumerated. Among them, the one which has a glass transition temperature (Tg) of more than 50° C. is preferable. As the antistatic agent, for example, fine metal oxide powder of tin oxide or the like, conductive materials having a π-electron conjugated structure such as sulfonated polyaniline, polythiophene, polypyrrole or the like may be enumerated.

There is no particular limitation about the method of forming the primer layer 6. The primer layer 6 may be formed, for instance, by dissolving or dispersing the above mentioned the binder resin, and optionally, other ingredients to be added, such as the curing agent, the adhesion promoter, the antistatic agent, etc., into a suitable solvent in order to prepare a coating liquid for forming the primer layer; coating thus prepared coating liquid onto the substrate 1, in accordance with a known coating procedure such as the gravure printing method, the reverse roll coating method using a gravure plate, the roll coater, the bar coater or the like; and then drying the coated liquid.

Although there is no particular limitation about the thickness of the primer layer 6, but it is preferable to be in the range of about 0.01 µm-0.3 µm, in consideration of heat resistance and adhesiveness.

Further, it is possible to provide another layer between the back face layer 5 and the substrate 1, in conjunction with or instead of, the primer layer 6 As another layer, for example, an antistatic layer or the like may be enumerated.

(Heat-Resistant Lubricating Layer of the Second Embodiment)

As shown in FIGS. 5 and 6, the heat-resistant lubricating layer 7 of the second embodiment is composed of two or more layers which include a backing layer 5. In this embodiment, among the layers constituting the heat-resistant lubricating layer 7, the polygonal shaped organic minute particles 20 are contained in the layer other than the back face layer 5. And, a configuration that a portion of the surfaces of the polygonal shaped organic minute particles 20 which are contained in the layer other than the back face layer 5 protrude through the surface of the back face layer 5 is taken in this embodiment. Hereinafter, the layer into which the polygonal shaped organic minute particles are contained and which is other than the back face layer 5 will be sometimes referred to as "other layer".

The thermal transfer sheet of the second embodiment, the polygonal shaped minute particles 20 are contained in the "other layer" other than the back face layer 5. Accordingly, in the this embodiment, the heat-resistant lubricating layer 7 include two or more layers which comprise the back face layer 5 and the "other layer(s)". The back face layer 5 is arranged at a position farthest from the substrate 1 among the layers constituting the heat-resistant lubricating layer 7.

The heat-resistant lubricating layer 7 of the second embodiment is different from the heat-resistant lubricating layer of the first embodiment described above in that the layers to contain the polygonal shaped minute particles 20 are different mutually. In other words, the heat-resistant lubricating layer 7 of the second embodiment is different from the heat-resistant lubricating layer of the first embodiment described above in that the polygonal shaped organic minute particles are contained in the "other layer" and a portion of the surfaces of the polygonal shaped organic minute particles 20 which are contained in the "other layer" protrude through the surface of the back face layer 5, in the second embodiment.

However, the point that a portion of the surfaces of the polygonal shaped organic minute particles 20 protrude through the surface of the back face layer 5, per se, is common in the heat-resistant lubricating layer of the first embodiment and the heat-resistant lubricating layer of the second embodiment. Owing to this community, the heat-resistant lubricating layer 7 of the second embodiment can enjoy the same functions and effects as the heat-resistant lubricating layer of the first embodiment described above.

(Other Layer)

There is no particular limitation about the "other layers" into which the polygonal shaped organic minute particles are contained, and it is possible to employ any layer provided between the back face layer 5 and the substrate 1. For example, as shown in FIGS. 5 and 6, the primer layer 6 for improving the adhesiveness between the back face layer 5 and the substrate 1 may be adopted as the "other layer". Alternatively, yet another layer may be adopted as the "other layer". As the "other layer" other than the primer layer 6, for example, an antistatic layer or the like can be enumerated. In the thermal transfer sheet 10 of the embodiment illustrated in these figures, the primer layer 6 is provided as "other layer" between the substrate 1 and the back face layer 5, and in this primer layer 6, the polygonal shaped organic minute particles 20 are contained. Further, a portion of the surface of the polygonal shaped organic minute particles 20 contained in the primer layer 6 is protruded through the surface of the back face layer 5. Now, the "other layer" will be described by taking the primer layer 6 as a typical example. However, it should be noted that the primer layer 6, per se, is an optional constituent in the thermal transfer sheet 10 according to the present invention, and the thermal transfer sheet 10 of this embodiment.

Instead of the thermal transfer sheet 10 of the embodiment shown in FIGS. 5 and 6, it is possible to provide "other layer (s)", which will bring one or more of various functions, between the primer layer 6 and the back face layer 5, and to allow the "other layer" provided between the primer layer 6 and the back face layer 5 to contain the polygonal shaped organic minute particles 20. In addition, it is also possible to provide "other layer(s)", which will bring one or more of various functions, between the substrate 1 and the primer layer 6, and to allow the "other layer" provided between the substrate 1 and the primer layer 6 to contain the polygonal shaped organic minute particles 20.

In the "other layer", a binder resin and the polygonal shaped organic minute particles 20 are contained. with respect to the polygonal shaped organic minute particles 20 in this embodiment, unless otherwise specified, those described in the thermal transfer sheet 10 of the first embodiment can be appropriately selected and used, and thus, the description thereof is omitted here.

Although there is no particular limitation for the particle diameter of the organic minute particles 20 to be contained in the "other layers", but organic minute particles 20 having a particle diameter of at least greater than the thickness of the back face layer 5 is contained in the "other layer". In the case that the particle diameter of the organic minute particles 20 contained in the "other layer" is less than the thickness of the back face layer 5, it is impossible that a portion of the surface of the organic minute particles 20 protrudes through the surface of the layer 5 as shown in FIGS. 5 and 6.

Therefore, it is necessary to select an optimal particle diameter of the organic minute particle 20 in consideration of the thickness of the back face layer and the thickness of the "other layer". Further, when further other distinct layer(s) is provided between the "other layer" and the back face layer 5, it is necessary to select an optimal particle diameter of the organic minute particle 20 in consideration of the thickness of the further other distinct layer(s) as well as the thickness of the back face layer and the thickness of the "other layer".

In the "other layer", a binder resin for holding the organic particles 20 is included. There is no particular limitation about the binder resin, and it may be appropriately selected depending on the functionality of such a "other layer". For instance, it is possible to use any of the binder resins as described in the back face layer 5 of the first embodiment and the binder resins described in the primer layer 6, upon an appropriate selection. It is also possible to use a binder resin other than those. The binder resin contained in the "other layer", may be one single kind, or may be used in combination of two or more kinds thereof.

There is no particular limitation for the addition amount of the polygonal shaped organic minute particles 20 to be contained in the "other layer", as long as the amount is within the range of not degrading the functions or the like which are required to the back face layer 5. For instance, when the organic minute particles 20 is added to the primer layer 6, it is preferable that the addition amount of the organic minute particles 20 is not less than 0.01% by weight and more than 3% by weight, on the basis of the total solid content of the primer layer 6. Further, in the case that the organic minute particles 20 are added to the primer layer 6, there is no especially limitation about the particle diameter of the organic minute particles 20, and the particle diameter may be decided within the range that allows a portion of the surface of the organic minute particles to protrude through the surface of the heat-resistant lubricating layer 7, in consideration of the thickness of the primer layer 6 and the thickness of the back face layer 5.

The back face layer 5 of the second embodiment and the back face layer 5 in the first embodiment differs only in terms of whether or not containing the polygonal shaped organic minute particles 20, but are just the same about the other points as described in the back face layer 5 of the first embodiment. Therefore, as the back face layer 5 contained in the heat-resistant lubricating layer 7 of the thermal transfer sheet 10 according to the second embodiment, it is possible to use a construction of the back face layer 5 described in the thermal transfer sheet according to the first embodiment, excluding the polygonal shaped organic minute particles 20.

It is preferable that the binder resin contained in the back face layer 5 of the second embodiment is a cured resin in which one or both of polyvinyl butyral resin and polyvinyl acetal resin was cured by an isocyanate curing agent. When such a cured resin is included in the back face layer 5 of the second embodiment, it becomes possible to hold firmly the organic minute particles 20 which protrude through the surface of the "other layer" by the cured resin which is included in the back face layer 5, and to prevent effectively the detachment of the organic minute particles 20.

With respect to the heat-resistant lubricating layer which constitutes the thermal transfer sheet 10 according to the present invention, those of the first embodiment and the second embodiment are described in detail as above. However, without deviating from the scope and the spirit of the present invention, various changes and modifications may be applied to these embodiments. For example, in the case where the heat-resistant lubricating layer 7 is composed of two or more layers which includes a backing layer 5, it is possible to adopt any of configurations where the heat-resistant lubricating layer of the first embodiment and the heat-resistant lubricating layer of the second embodiment are used in combination, concretely, a configuration where both the back face layer 5 and the "other layer" contain the polygonal shaped organic minute particles, and each individual portions of the surfaces of the organic particles 20 contained in the respective layers protrude through the back face layer 5.

The invention is characterized in that the back face layer 5 as described above on one surface of the substrate 1 is provided. Therefore, there is not particular limitation about layer(s) which is provided on the other surface of the substrate 1. For example, it is possible to provide a transcriptive protective layer or a color material layer which are known in the field of thermal transfer sheet.

(Transcriptive Protective Layer)

In the embodiment shown in FIGS. 1, 3, 5, the transcriptive protective layer 3 which is capable of exfoliating from the substrate 1 is formed on another surface of the substrate 1 which is opposite to the surface of the substrate 1 on which the back face layer is formed (upper surface of the substrate 1 in the cases shown in FIGS. 1, 3, 5). The transcriptive protective layer 3 is provided in order to impart gloss to the printed matter to which the transcription protective layer 3 is transferred, while improving the durability of the printed matter. Herein, the transcriptive protective layer 3 is an optional configuration in the thermal transfer sheet according to the present invention.

Material for forming the transcriptive protective layer 3 is not particularly limited as long as the material has transparency and glossiness. As such a material, for example, meth-acrylic acid ester copolymers, vinyl chloride-vinyl acetate copolymers, polyester resins, polycarbonate resins, acrylic resins, ultraviolet-absorbing resins, epoxy resins, polystyrene resins, polyurethane resins, acrylic urethane resin, silicone modified derivatives of above mentioned resins, blends of any combination of above mentioned resins, ionizing radiation-curable resins, ultraviolet-absorbing resins, etc., are exemplified.

Further, the transcriptive protective layer 3 containing an ionizing radiation curable resin may be suitably used as a material of the transcriptive protective layer 3 in that the plasticizer resistance and the abrasion resistance are particularly excellent. It is not particularly limited as ionizing radiation curable resin, and can be suitably selected from conventionally known ionizing radiation curable resins, for example, a resin formed by cross-linking and curing a radically polymerizable polymer or oligomer through ionizing radiation irradiation and, optionally, adding a photopolymerization initiator thereto, and then performing polymerization cross-linking by applying an electron beam or ultraviolet light may be used. The transcriptive protective layer 3 containing an ultraviolet-absorbing resin is excellent in giving a light resistance to the printed matter.

As the ultraviolet absorbing resin, for example, it is possible to react to the ionizing radiation curable resin of the thermoplastic resin or a reactive UV absorber and a resin obtained by bonded. Specifically, the organic UV absorbers salicylate, benzophenone, benzotriazole, substituted acrylonitrile, nickel chelate-based, non-reactive known as hindered amine-based, dual addition polymerizable more I include those introduced (vinyl group, for example, acryloyl group, methacryloyl group, etc.) binding, alcoholic hydroxyl group, an amino group, a carboxyl group, an epoxy group, a reactive group such as an isocyanate group.

There is no particular limitation about the thickness of the transcriptive protective layer 3. When the thickness of the transcriptive protective layer 3 is thinner than 0.1 µm, however, it may be difficult to give durability on the surface of the printed matter onto which the transcriptive protective layer 3 was transferred. Considering these points, the thickness of the transcriptive protective layer 3 is usually in the range of about 0.1-10 µm, and preferably, about 0.5-5.0 µm.

Further, in the transcriptive protective layer 3, a agent for improving the sliding properties to the article for receiving transcription, such as silicon filler, talc, kaolin, mica, graphite, calcium carbonate, molybdenum disulfide, silicone rubber filler, benzoguanamine resins, melamine-formaldehyde condensates or the like may be contained.

The method of forming the transcriptive protective layer 3, with an appropriate solvent to prepare a transcriptive protective layer coating solution by dispersing or dissolving one or more of the resin to the substrate 1 on this It can be applied by conventional means known reverse coating method or the like using a gravure printing method, a gravure plate or a screen printing method to form by drying.

(Color Material Layer)

In the embodiment shown in FIGS. 2, 4, 6, a color material layer 4 is formed on another surface of the substrate 1 which is opposite to the surface of the substrate 1 on which the back face layer is formed (upper surface of the substrate 1 in the cases shown in FIGS. 2, 4, 6).

When the thermal transfer sheet according to the present invention is a sublimation type thermal transfer sheet, sublimable dye-containing color material layers are formed as the color material layer. On the other hand, when the thermal transfer sheet according to the present invention is a heat-fusion type thermal transfer sheet, the color material layer comprises a heat-fusion composition which contains coloring agent, and becomes a color material layer containing heat-fusion ink. In addition, for instance, a color material layer containing a sublimable dye and another color material layer containing a heat-fusion type ink which comprises a heat-fusion type composition with a dye, may be provided on one continuous substrate as being frame sequentially. The thermal transfer sheet according to the present invention will be described by taking a sublimation type thermal transfer sheet as a typical example. However, it should be noted that the thermal transfer sheet according to the present invention is not limited to the sublimation type thermal transfer sheet only.

As the materials for the color material layer 4, any conventionally known dyes may be used. Among them, the ones which have good characteristics for the printing material, for instance, the ones which possess an adequate coloring density, and which can be hardly discolored or faded by light, heat, or temperature are preferable. Examples of such dyes include diarylmethane dyes; triarylmethane dyes; thiazole dyes; merocyanine dyes; pyrazolone dyes; methine dyes; indoaniline dyes; azomethine dyes such as acetophenone azomethine dyes, pyrazolo azomethine dyes, imidazol eazomethine dyes, imidazo azomethine dyes, and pyridone azomethine dyes; xanthene dyes; oxazine dyes; cyanostyrene dyes such as dicyanostyrene dyes and tricyanostyrene dyes; thiazine dyes; azine dyes; acridine dyes; benzeneazo dyes; azo dyes such as, pyridoneazo dyes, thiopheneazo dyes, isothiazoleazo dyes, pyrroleazo dyes, pyrazoleazo dyes, imidazoleazo dyes, thiadiazoleazo dyes, triazoleazo dyes, and disazo dyes; spiropyran dyes; indolinospiropyran dyes; fluoran dyes; rhodaminelactam dyes; naphthoquinone dyes; anthraquinone dyes; and quinophthalone dyes. Concretely, red dyes such as MSRedG (manufactured by Mitsui Toatsu Chemicals, Inc.), Macrolex Red Violet R (manufactured by Bayer), CeresRed 7B (manufactured by Bayer), Samaron Red F3BS (manufactured by Mitsubishi Chemical Co., Ltd.); yellow dyes such as Holon brilliant yellow 6GL (manufactured by Clariant), PTY-52 (manufactured by Mitsubishi Chemical Industries, Ltd.), MACROLEX Yellow 6G (manufactured by Bayer); blue dyes such as Kayaset Blue 714 (manufactured by Nippon Kayaku Co., Ltd.), Waxoline Blue AP-FW (manufactured by ICI), Holon Brilliant Blue S—R (manufactured by Sandoz), MS Blue 100 (manufactured by Mitsui Toatsu Chemical Co., Ltd.), C. I. Solvent Blue 22; etc., are exemplified.

As the binder resin for supporting such a dye, for instance, cellulosic resins such as ethylcellulose, hydroxyethylcellulose, ethylhydroxycellose, hydroxypropylcellulose, methylcellulose, cellulose acetate, and cellulose tributyrate; vinyl resins such as polyvinylalcohol, polyvinyl acetate, polyvinylbutyral, polyvinylacetoacetal, and polyvinylpyrrolidone; acrylic resins such as poly(meth)acrylate and poly(meta) acrylamide; polyurethane resins, polyamide resins, polyester resins, and the like. Among them, cellulosic, vinyl, acrylic, urethane, and polyester resins are preferable from the points of heat resistance and dye-transfer efficiency.

The color material layer 4 may be formed by dissolving or dispersing the dye and the binder resin together with optional additives such as the releasing agent and fillers, etc., in a suitable solvent such as toluene, methyl ethyl ketone, ethanol, isopropyl alcohol, cyclohexane, dimethyl formamide, etc., to prepare a coating liquid; coating the coating liquid on the substrate by a conventional method such as gravure printing, reverse roll coating using a gravure plate, roll coater, bar-coater, etc.; and drying the coated liquid.

(Releasing Layer)

It is also possible to form a releasing layer 2 between the transcriptive protective layer 3 and the substrate 1 as shown in FIGS. 1,3,5. Incidentally, the releasing layer is an optional layer in the thermal transfer sheet 10 of the present invention. The resin for forming the releasing layer 2 is not particularly limited as long as it is known as the releasing resin, for example, waxes, silicone waxes, silicone resins, silicone-modified resins, fluorine-containing resins, fluorine-modified resins, polyvinyl alcohols, acrylic resins, thermally cross-linkable epoxy-amino resins, thermally cross-linkable alkyd-amino resins, etc., are enumerated. Further, the releasing layer 2 may be made of one type resin, or two or more resins. Further, the releasing layer 2 may be formed by using a catalytic cross-linking agent such as isocyanate compound, tin-based catalysts, aluminum-based catalyst, etc., in addition to the releasing resin. Herein, it should be noted, the releasing layer 2 may be transferred to the transcription receiving side on transcription, or otherwise, may be remained on the substrate 1 side. The thickness of the releasing layer 2 is about 0.5-5 μm in general. The releasing layer 2 may be formed, for instance, by dissolving or dispersing the above mentioned resin to prepare a coating liquid for forming releasing layer; coating thus prepared coating liquid onto the substrate in accordance with a known coating procedure such as the gravure printing method, the screen printing method, the reverse roll coating method using a gravure plate, or the like; and then drying the coated liquid.

(Heat Seal Layer)

It is possible to form a heat seal layer (not shown) on the transcriptive protective layer 3. The heat seal layer is an optional layer in the thermal transfer sheet 10 of the present invention and is provided for improving the adhesiveness of the transcriptive protective layer 3 to an article for receiving transcription. There is no particular limitation about the material for forming a heat seal layer, and it is possible to use any of heat-sensitive adhesives known in the art. It is more preferable that the heat seal layer is formed with a thermoplastic resin of which glass transition temperature is in the range of 50-100° C., for example, one which has a refractive index within the range of 1.52 to 1.59, and has an appropriate glass transition temperature, and selected from resins having a good thermal adhesiveness, such as acrylic resins, vinyl chloride-vinyl acetate copolymer resins, epoxy resins, polyester resins, polycarbonate resins, butyral resins, polyamide resins, vinyl chloride resin, etc.

There is no particular limitation about the method for forming the heat seal layer. The heat seal layer may be formed by dissolving or dispersing the above mentioned resin into a suitable solvent, such as methyl ethyl ketone, toluene, isopropyl alcohol, etc., and optionally, adding ultraviolet absorber, antioxidant, fluorescent brightener, inorganic or organic filler component, surfactant, release agents, etc., to prepare a coating liquid; coating thus prepared coating liquid in accordance with a known coating procedure such as the gravure printing method, the reverse roll coating method using a gravure plate, or the like so as to form; and then drying the coated liquid so as to form a film of 0.5-10 μm in thickness.

It is also possible to provide the above-mentioned transcriptive protective layer 3 and the color material layer 4 on the substrate 1 as being frame sequentially.

(Article for Receiving Transcription)

As article for receiving transcription (thermal transfer image-receiving sheet), which may be used for the transcription of the thermal transfer sheet 10, any materials known in this art, such as plain paper, high quality paper, tracing paper, plastic film, etc., are enumerated and the material to be used is not particularly limited.

EXAMPLES

Hereinafter, the present invention will be described with referring to Examples and Comparative Examples. Herein, the simplified expressions of "part (s)" in this specification mean "part (s) by weight", unless otherwise especially mentioned.

Example 1

As a substrate, polyethylene terephthalate film which had 6 μm in thickness was used. On one surface of this substrate, a liquid for forming releasing layer having the following composition was coated in accordance with the gravure coating method so as to obtain a releasing layer having a thickness of 1.0 μm. Then, a liquid for forming transcriptive protective layer having the following composition was coated on the releasing layer in accordance with the gravure coating method so as to obtain a transcriptive protective layer having a thickness of 1.0 μm. On other surface of the substrate, a liquid for forming primer layer 1 having the following composition was coated in accordance with the gravure coating method so as to obtain a primer layer having a thickness of 0.2 μm. Then, a liquid for forming back face layer 1 having the following composition was coated on the primer layer in accordance with the gravure coating method so as to obtain a back face layer having a thickness of 0.5 μm. Thus, the thermal transfer sheet of Example 1 was prepared.

<Liquid for Forming Releasing Layer>

| | |
|---|---|
| Silicone modified acrylic resin | 16 parts |
| (Cell top 226, manufactured by DAICEL Corp.) | |
| Silicone modified acrylic resin | 8 parts |
| (Cell top 227, manufactured by DAICEL Corp.) | |
| Vinyl chloride - vinyl acetate copolymer | 2.4 parts |
| (SOLBIN A, manufactured by Nissin Chemical Industry Co., Ltd,) | |
| Curing catalyst | 4.5 parts |
| (Cell top CAT-A, manufactured by DAICEL Corp.) | |
| Ultraviolet ray absorber | 0.05 parts |
| (Uvitex OB, manufactured by Nippon Ciba-Geigy Corp.) | |
| Toluene | 9.8 parts |
| Methyl ethyl ketone | 9.8 parts |

<Liquid for Forming Transcriptive Protective Layer>

| | |
|---|---|
| Vinyl chloride - vinyl acetate copolymer | 4.5 parts |
| (SOLBIN CNL, manufactured by Nissin Chemical Industry Co., Ltd,) | |
| Ultraviolet ray absorber | 15 parts |
| (ST-I UVA 40KT, manufactured by DAICEL Corp.) | |
| Acryl resin liquid | 15 parts |
| (LP-45M, manufactured by Showa Ink Manufacturing Co., Ltd., solid content: 13%) | |

<Liquid for Forming Primer Layer 1>

| | |
|---|---|
| Polyester (solid content: 30%) | 16.67 parts |
| (Product name: POLYESTER WR-961, manufactured by Nippon Synthetic Chemical Industry Co., Ltd.) | |
| Water | 41.67 parts |
| Isopropyl Alcohol | 41.67 parts |

<Liquid for Forming Back Face Layer 1>

| Molar equivalent ratio (—NCO/—OH): 0.53 | |
|---|---|
| Polyvinyl acetal resin (S-LEC KS-1, manufactured by Sekisui Chemical Co., Ltd.) | 51.2 parts |
| Polyisocyanate (BURNOCK D750, manufactured by DIC Corporation) | 17.8 parts |
| Silicone resin (particle diameter: 3 μm, polygonal shape) (MSP-4000, manufactured by Nikko Rika Corp.) | 1 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

Example 2

A thermal transfer sheet of Example 2 was obtained by carrying out the same procedure in Example 1 except that the liquid for forming back face layer 1 was replaced by a liquid for forming back face layer 2 having the following composition.

<Liquid for Forming Back Face Layer 2>

| Molar equivalent ratio (—NCO/—OH): 0.53 | |
|---|---|
| Polyvinyl acetal resin (S-LEC KS-1, manufactured by Sekisui Chemical Co., Ltd.) | 51.2 parts |
| Polyisocyanate (BURNOCK D750, manufactured by DIC Corporation) | 17.8 parts |
| Silicone resin (particle diameter: 4 μm, polygonal shape) (Tospearl 240, manufactured by Momentive Performance Materials Japan LLC) | 1 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

Example 3

A thermal transfer sheet of Example 3 was obtained by carrying out the same procedure in Example 1 except that the liquid for forming back face layer 1 was replaced by a liquid for forming back face layer 3 having the following composition.

<Liquid for Forming Back Face Layer 3>

| Molar equivalent ratio (—NCO/—OH): 0.52 | |
|---|---|
| Polyvinyl acetal resin (S-LEC KS-1, manufactured by Sekisui Chemical Co., Ltd.) | 47.5 parts |
| Polyisocyanate (BURNOCK D750, manufactured by DIC Corporation) | 16.5 parts |
| Silicone resin (particle diameter: 4 μm, polygonal shape) (Tospearl 240, manufactured by Momentive Performance Materials Japan LLC) | 1 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

Example 4

A thermal transfer sheet of Example 4 was obtained by carrying out the same procedure in Example 1 except that the liquid for forming back face layer 1 was replaced by a liquid for forming back face layer 4 having the following composition.

<Liquid for Forming Back Face Layer 4>

| Molar equivalent ratio (—NCO/—OH): 0.21 | |
|---|---|
| Polyvinyl acetal resin (S-LEC KS-1, manufactured by Sekisui Chemical Co., Ltd.) | 60.6 parts |
| Polyisocyanate (BURNOCK D750, manufactured by DIC Corporation) | 8.4 parts |
| Silicone resin (particle diameter: 4 μm, polygonal shape) (Tospearl 240, manufactured by Momentive Performance Materials Japan LLC) | 1 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

Example 5

A thermal transfer sheet of Example 4 was obtained by carrying out the same procedure in Example 1 except that the liquid for forming back face layer 1 was replaced by a liquid for forming back face layer 5 having the following composition, and the liquid for forming primer layer 1 was replaced by a liquid for forming primer layer 2 having the following composition.

<Liquid for Forming Back Face Layer 5>

| Molar equivalent ratio (—NCO/—OH): 0.21 | |
|---|---|
| Polyvinyl acetal resin (S-LEC KS-1, manufactured by Sekisui Chemical Co., Ltd.) | 60.6 parts |
| Polyisocyanate (BURNOCK D750, manufactured by DIC Corporation) | 8.4 parts |

-continued

| Molar equivalent ratio (—NCO/—OH): 0.21 | |
|---|---|
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

<Liquid for Forming Primer Layer 2>

| | |
|---|---|
| Polyvinyl alcohol resin (Kuraray POVAL PVA-117 manufactured by Kuraray Co., Ltd., solid content: 100%, polymerization degree: 1700) | 2.67 parts |
| Titanium Chelating agent (solid content: 42%) (ORGATIX TC-300, manufactured by Matsumoto Fine Chemical Co., Ltd. | 55.5 parts |
| Silicone resin (particle diameter: 4 μm, polygonal shape) (Tospearl 240, manufactured by Momentive Performance Materials Japan LLC) | 0.26 part |
| Water | 45.89 parts |
| Isopropyl Alcohol | 45.89 parts |

Example 6

A thermal transfer sheet of Example 5 was obtained by carrying out the same procedure in Example 1 except that the liquid for forming back face layer 1 was replaced by the liquid for forming back face layer 5 having above-mentioned composition, and the liquid for forming primer layer 1 was replaced by a liquid for forming primer layer 3 having the following composition.
<Liquid for Forming Primer Layer 3>

| | |
|---|---|
| Polyester (POLYESTER WR-961, manufactured by Nippon Synthetic Chemical Industry Co., Ltd., solid content: 30%)) | 16.67 parts |
| Silicone resin (particle diameter: 4 μm, polygonal shape) (Tospearl 240, manufactured by Momentive Performance Materials Japan LLC) | 0.05 part |
| Water | 41.67 parts |
| Isopropyl Alcohol | 41.66 parts |

Example 7

A thermal transfer sheet of Example 7 was obtained by carrying out the same procedure in Example 1 except that the liquid for forming back face layer 1 was replaced by a liquid for forming back face layer 7 having the following composition.
<Liquid for Forming Back Face Layer 7>

| Molar equivalent ratio (—NCO/—OH): 0.01 | |
|---|---|
| Polyvinyl acetal resin (S-LEC KS-1, manufactured by Sekisui Chemical Co., Ltd.) | 68.6 parts |
| Polyisocyanate (BURNOCK D750, manufactured by DIC Corporation) | 0.5 parts |
| Silicone resin (particle diameter: 4 μm, polygonal shape) (Tospearl 240, manufactured by Momentive Performance Materials Japan LLC) | 1 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

Example 8

A thermal transfer sheet of Example 8 was obtained by carrying out the same procedure in Example 1 except that the liquid for forming back face layer 1 was replaced by a liquid for forming back face layer 8 having the following composition.
<Liquid for Forming Back Face Layer 8>

| Molar equivalent ratio (—NCO/—OH): 0.2 | |
|---|---|
| Polyvinyl acetal resin (S-LEC KS-1, manufactured by Sekisui Chemical Co., Ltd.) | 60.6 parts |
| Polyisocyanate (BURNOCK D750, manufactured by DIC Corporation) | 8.4 parts |
| Silicone resin (particle diameter: 4 μm, polygonal shape) (Tospearl 240, manufactured by Momentive Performance Materials Japan LLC) | 0.01 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| Filler (MICRO ACE P-3, manufactured by Nippon Talc Co., Ltd.) | 1 part |
| methyl ethyl ketone | 200 parts |
| toluene | 100 parts |

Comparative Example 1

A thermal transfer sheet of Comparative Example 1 was obtained by carrying out the same procedure in Example 1 except that the liquid for forming back face layer 1 was replaced by a liquid for forming back face layer A having the following composition.
<Liquid for Forming Back Face Layer A>

| Molar equivalent ratio (—NCO/—OH): 0.52 | |
|---|---|
| Polyvinyl acetal resin (S-LEC KS-1, manufactured by Sekisui Chemical Co., Ltd.) | 52 parts |
| Polyisocyanate (BURNOCK D750, manufactured by DIC Corporation) | 18 parts |

-continued

| Molar equivalent ratio (—NCO/—OH): 0.52 | |
|---|---|
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

Comparative Example 2

A thermal transfer sheet of Comparative Example 2 was obtained by carrying out the same procedure in Example 1 except that the liquid for forming back face layer 1 was replaced by a liquid for forming back face layer B having the following composition.
<Liquid for Forming Back Face Layer B>

| Molar equivalent ratio (—NCO/—OH): 0.53 | |
|---|---|
| Polyvinyl acetal resin (S-LEC KS-1, manufactured by Sekisui Chemical Co., Ltd.) | 51.2 parts |
| Polyisocyanate (BURNOCK D750, manufactured by DIC Corporation) | 17.8 parts |
| Silicone resin (average particle diameter: 2 μm, spherical shape) (Tospearl 120, manufactured by Momentive Performance Materials Japan LLC) | 1 part |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Polyethylene wax (POLYWAX 3000, manufactured by Toyo ADL Corp.) | 10 parts |
| methyl ethyl ketone | 200 parts |
| toluene | 100 parts |

(Evaluation for Printing Residue)

Each of the thermal transfer sheets obtained in Examples 1 to 8 and Comparative Examples 1 and 2 was in combination with a thermal transfer image-receiving sheet for Mitsubishi Electric Corporation's sublimation type printer (CP9800D), and underwent printings for 0-gray scale image, 128-gray scale, and 225-gray scale image, at printing meter numbers of 400 m, 800 m, and 1200 m, respectively, under the following condition. The conditions of the printing residue attached to the thermal head at these printings were observed visually, and were evaluated according to the following criteria. The evaluation results were shown in Table 1.

"Printing Condition"
Thermal head: head resistance 5020Ω, resolution 300 dpi (dots per inch) (manufactured by Toshiba Hokuto Electronics Co., Ltd.)
Line speed: 1 ms/Line, (The resolution in the sheet conveying direction was 300 lpi (line per inch).)
Pulse duty; 90%
Applied power: 32V
Printing pressure; 40N Print image: the size was 1600 pixels in width×1090 pixels in length, and the images were gradient images of 0-255 gray scale (1 pixel was correspondent to 1 dot.)

"Evaluation Criteria"

⊚: The printing residue was not accumulated around heating element.

○: A trace quantity of the printing residue was observed around the heating element.

Δ: Inconsistencies in density were not observed on the printing, although the printing residue was accumulated around heating element.

X: Inconsistencies in density were appeared on the printing, and the printing residue was accumulated around heating element.

Incidentally, when the evaluation is ⊚ or ○, it is possible to obtain a good printed matter with little fear of causing color voids in the printed matter.

(Evaluation for Inconsistencies in Density on Printing)

Each of the thermal transfer sheets obtained in Examples 1 to 8 and Comparative Examples 1 and 2 was in combination with a thermal transfer image-receiving sheet for Mitsubishi Electric Corporation's sublimation type printer (CP9800D), and underwent printings of 255-gray scale pattern in the first half, and 180-gray scale pattern in the second half. The obtained printings were observed visually, and were evaluated according to the following criteria. The evaluation results were shown in Table 1. Herein, the printing condition used herein was the same as used in the above mentioned evaluation for printing residue.

"Evaluation Criteria"

○: The 180-gray scale part of the printed matter was uniformly printed. There is no inconsistency in density on the printed matter.

Δ: Inconsistencies in density were slightly observed in the 180-gray scale part of the printed matter.

X: Inconsistencies in density were significantly observed in the 180-gray scale part of the printed matter.

(Evaluation of Printing Flaws)

Each of the thermal transfer sheets obtained in Examples 1 to 8 and Comparative Examples 1 and 2 was in combination with a thermal transfer image-receiving sheet for Mitsubishi Electric Corporation's sublimation type printer (CP9800D), and underwent printings of 255-gray scale pattern at printing meter numbers of 20 m, respectively, under the above mentioned printing condition. Herein, the printing was performed at 0° C. environment. The obtained printings were observed visually, and were evaluated for the printing flaws according to the following criteria. The evaluation results were also shown in Table 1.

"Evaluation Criteria"

○: There was no occurrence of the printing flaw.

Δ: There were occurrences of printing flaws, but no tendency to increase.

X: There were occurrences of printing flaws, and the number of occurred print flaws was increased as the number of printing was increased.

Incidentally, when the evaluation is ○, it is possible to obtain a good printed matter with little fear of causing color voids in the printed matter.

TABLE 1

| | Evaluation for Printing residue ||||||||| Evaluation for inconsistencies in density on printing | Evaluation for printing flaws |
|---|---|---|---|---|---|---|---|---|---|---|---|
| | 255-gray scale ||| 128-grey scale ||| 0-grey scale ||| | |
| | 400 m | 800 m | 1200 m | 400 m | 800 m | 1200 m | 400 m | 800 m | 1200 m | | |
| Example 1 | ◎ | ◎ | ◎ | ◎ | ◎ | ◎ | ◎ | ◎ | ◎ | ○ | ○ |
| Example 2 | ◎ | ◎ | ◎ | ◎ | ◎ | ◎ | ◎ | ◎ | ◎ | ○ | ○ |
| Example 3 | ◎ | ◎ | ◎ | ◎ | ◎ | ◎ | ◎ | ◎ | ◎ | ○ | ○ |
| Example 4 | ◎ | ◎ | ◎ | ◎ | ◎ | ◎ | ◎ | ◎ | ◎ | ○ | ○ |
| Example 5 | ◎ | ○ | ○ | ◎ | ◎ | ○ | ◎ | ◎ | ◎ | ○ | ○ |
| Example 6 | ◎ | ○ | ○ | ◎ | ◎ | ○ | ◎ | ◎ | ◎ | ○ | ○ |
| Example 7 | ◎ | ◎ | ◎ | ◎ | ◎ | ◎ | ◎ | ◎ | ◎ | ○ | ○ |
| Example 8 | ◎ | ○ | ○ | ◎ | ◎ | ○ | ◎ | ◎ | ◎ | ○ | ○ |
| Comparative Example 1 | △ | X | X | ○ | ○ | △ | ○ | ○ | ○ | X | X |
| Comparative Example 2 | ○ | △ | X | ○ | ○ | △ | ○ | ○ | ○ | △ | △ |

EXPLANATION OF NUMERIC SYMBOLS

1 . . . Substrate
2 . . . Releasing layer
3 . . . Transcriptive protective layer
4 . . . Color material layer
5 . . . Back face layer
6 . . . Primer layer
7 . . . Heat-resistant lubricating layer
20 . . . Polygonal shaped organic minute particle
10 . . . Thermal transfer sheet

The invention claimed is:

1. A thermal transfer sheet comprising a heat-resistant lubricating layer formed on a surface of a substrate,
the lubricating layer comprising a back face portion arranged as an outermost layer of the lubricating layer,
the lubricating layer comprising a binder resin and organic minute particles having a polygonal shape,
wherein a portion of the surface of the organic minute particles protrudes from an outermost surface of the back face portion.

2. The thermal transfer sheet according to claim 1, wherein the organic minute particles are silicone resin minute particles.

3. The thermal transfer sheet according to claim 1, wherein the organic minute particles have an average particle diameter of 0.3 μm to 15 μm.

4. The thermal transfer sheet according to claim 1, wherein the binder resin is a cured resin in which one or both of polyvinyl butyral resin and polyvinyl acetal resin was cured by an isocyanate curing agent, and a molar equivalent ratio of hydroxyl groups included in the one or both of the polyvinyl butyral resin and polyvinyl acetal resin and isocyanate groups of the isocyanate curing agent (—NCO/—OH) is 0.01 to 0.7.

5. The thermal transfer sheet according to claim 1, further comprising at least one of a color material layer and a transcriptive protective layer, provided on another surface of the substrate.

6. A thermal transfer sheet comprising a heat-resistant lubricating layer formed on a surface of a substrate,
the heat-resistant lubricating layer comprising one or more layers which includes a back face layer, the back face layer being arranged as an outermost layer of the lubricating layer, the lubricating layer comprising a binder resin,
wherein the back face layer comprises organic minute particles having a polygonal shape, and a portion of the surface of the organic minute particles protrudes from an outermost surface of the back face portion.

7. The thermal transfer sheet according to claim 6, wherein the organic minute particles are silicone resin minute particles.

8. The thermal transfer sheet according to claim 6, wherein the organic minute particles have an average particle diameter of 0.3 μm to 15 μm.

9. The thermal transfer sheet according to claim 6, wherein the binder resin is a cured resin in which one or both of polyvinyl butyral resin and polyvinyl acetal resin was cured by an isocyanate curing agent, and a molar equivalent ratio of hydroxyl groups included in the one or both of the polyvinyl butyral resin and polyvinyl acetal resin and isocyanate groups of the isocyanate curing agent (—NCO/—OH) is 0.01 to 0.7.

10. The thermal transfer sheet according to claim 6, further comprising at least one of a color material layer and a transcriptive protective layer, provided on another surface of the substrate.

11. The thermal transfer sheet according to claim 6, wherein heat-resistant lubricating layer comprises a primer layer arranged between the substrate and the back face layer, the primer layer comprising a binder resin.

12. The thermal transfer sheet according to claim 11, wherein the primer layer comprises one or more of a curing agent, an adhesion promoter, and an antistatic agent.

13. The thermal transfer sheet according to claim 11, wherein the back face layer comprises 0.01 to 3% by weight of the organic minute particles based on total solid content of the back face layer.

14. A thermal transfer sheet comprising a heat-resistant lubricating layer formed on a surface of a substrate,
the heat-resistant lubricating layer comprising one or more layers which includes a back face layer, the back face layer being arranged as an outermost layer of the heat-resistant lubricating layer, the heat-resistant lubricating layer comprising a binder resin,
wherein the heat-resistant lubricating layer comprises organic minute particles having a polygonal shape, and a portion of the surface of the organic minute particles protrudes from an outermost surface of the back face portion.

15. The thermal transfer sheet according to claim 14, wherein the organic minute particles are silicone resin minute particles.

16. The thermal transfer sheet according to claim 14, wherein the organic minute particles have an average particle diameter of 0.3 μm to 15 μm.

17. The thermal transfer sheet according to claim 14, wherein the binder resin is a cured resin in which one or both of polyvinyl butyral resin and polyvinyl acetal resin was cured by an isocyanate curing agent, and a molar equivalent ratio of hydroxyl groups included in the one or both of the polyvinyl butyral resin and polyvinyl acetal resin and isocyanate groups of the isocyanate curing agent (—NCO/—OH) is 0.01 to 0.7.

18. The thermal transfer sheet according to claim 14, further comprising at least one of a color material layer and a transcriptive protective layer, provided on another surface of the substrate.

19. The thermal transfer sheet according to claim 14, wherein the heat-resistant lubricating layer comprises a primer layer arranged between the substrate and the back face layer, the primer layer comprising a binder resin.

20. The thermal transfer sheet according to claim 19, wherein the primer layer comprises one or more of a curing agent, an adhesion promoter, and an antistatic agent.

21. The thermal transfer sheet according to claim 19, wherein the organic minute particles are at least partially contained in the primer layer.

22. The thermal transfer sheet according to claim 21, wherein the heat-resistant lubricating layer comprises 0.01 to 3% by weight of the organic minute particles based on total solid content of the primer layer.

* * * * *